Patented Nov. 9, 1937

2,098,222

UNITED STATES PATENT OFFICE 2,098,222

METHOD OF MAKING CEMENT OR BONDING MATERIAL

Philip S. Barnhart, Westfield, Mass., assignor to Westfield River Paper Company, Russell, Mass., a corporation of Massachusetts No Drawing. Application January 15, 1936, Serial No. 59,309

4 Claims. (Cl. 134—17)

This invention relates to a method of making cement or bonding material.

More particularly stated, the invention relates to a method of making a cement or compound developed for use in uniting or laminating sheets of paper or like material.

Although not limited to this particular use, the cement is especially adapted for this purpose since it is semi or substantially transparent and this quality is essential for a binder used to unite certain types of paper, such as the semi-transparent paper known to the trade as glassine paper.

Glassine paper is a product made from a highly gelatinized or hydrated fibre obtained chiefly from spruce wood, and processed on a regular fourdrinier wire machine. The paper after being dried is re-dampened to give a web with approximately 17 to 25% moisture content. It is then passed through the heated rolls of a super-calender to convert it to the semi-transparent stage known as glassine.

Moreover, it is essential that the cement be so constituted that it will retain its adhesive quality or will remain stable and efficient through a wide range of temperatures, that is, at temperatures such as high as 180° F. and at relatively low temperatures.

Sheets of paper have been united by a wax binder but such material softens and melts at the higher temperatures and becomes hard and crystalline at the lower temperatures causing the sheets to separate very easily.

Furthermore, it is highly desirable that the binder impart a moisture proofing quality to the sheets joined thereby.

This invention has for its salient object to provide a method of compounding ingredients to form a cement so constituted that it will be effective and flexible at high or low temperatures.

Another object of the invention is to provide a method of compounding ingredients to form a cement so constituted that it will be semi-transparent.

Another object of the invention is to provide a method of compounding ingredients to form a cement so constituted that it will be moisture proof and can be easily utilized.

Further objects will be clear from the following specification.

The ingredients or materials found most suitable for the compound or cement are wax, preferably paraffin wax, rosin, rubber, preferably of the type or grade of crepe rubber and petrolatum.

The rubber, preferably crepe rubber, is first softened by passing it between mill rolls which are preferably heated. In addition to the heat and pressure exerted by the rolls a kneading action is obtained by running one roll at a higher rate of speed than the other.

When the rubber has been softened in this manner, petrolatum having a melting point of approximately 125° F. is added in the approximate proportions of 60% rubber and 40% petrolatum.

Paraffin wax with a melting point of approximately 155° F. and petrolatum are then melted in a kettle or suitable receptacle and the rubber compound is added and the ingredients are then thoroughly agitated and mixed at a relatively high temperature, such as 230° F.–280° F.

After these materials have been combined as desired the rosin, preferably grade X or a semi-transparent or clear grade of rosin, is added to the mixture while hot. After thorough mixing the compound or cement is then ready for use.

A cement or compound of the character described forms a very effective binding material that will retain its adhesive and flexible qualities under a wide range of temperatures.

Although one particular method of combining the ingredients has been particularly described, it will be obvious that the method may be carried out in other ways, without departing from the spirit or scope of the invention, and that no limitations are intended other than those expressed in the following claims.

What I claim is:

1. A method of compounding a cement or bonding material having as ingredients wax, rosin, rubber and petrolatum which consists of softening the rubber by a pressing and kneading action, adding petrolatum to the rubber and heating and thoroughly intermixing the rubber and petrolatum mixture and then adding the mixture to melted paraffin wax and petrolatum and adding rosin to said mixture.

2. A method of compounding a cement or bonding material having as ingredients wax, rosin, rubber and petrolatum which consists of softening the rubber by pressure and kneading, further softening the rubber by intermixing the softened rubber with petrolatum, heating the mixture and dissolving in a melted mixture of pertolatum, paraffin wax and rosin.

3. A method of compounding a cement or bonding material having as ingredients wax, rosin, rubber and petrolatum in the approximate proportions of wax 40–63%, rosin 20–45%, rubber 3–12% and petrolatum 7–13%, which consists of softening the rubber by a pressing and kneading action, adding petrolatum to the rubber and heating and thoroughly intermixing the rubber and petrolatum mixture and then adding this mixture to a mixture of paraffin wax and petrolatum and adding rosin to said mixture.

4. A method of compounding a cement or bonding material having as ingredients wax, rosin, rubber and petrolatum which consists of softening the rubber by a pressing and kneading action, adding petrolatum having a melting point of approximately 125° F. to the rubber and heating to a temperature of approximately 230° F. and thoroughly intermixing the rubber and petrolatum mixture and then adding the mixture to melted paraffin wax having a melting point of approximately 155° F. and petrolatum and adding rosin to said mixture.

PHILIP S. BARNHART.